No. 748,440. PATENTED DEC. 29, 1903.
J. B. UNDERWOOD.
PROCESS OF HARVESTING AND CURING TOBACCO.
APPLICATION FILED MAY 9, 1903.
NO MODEL.
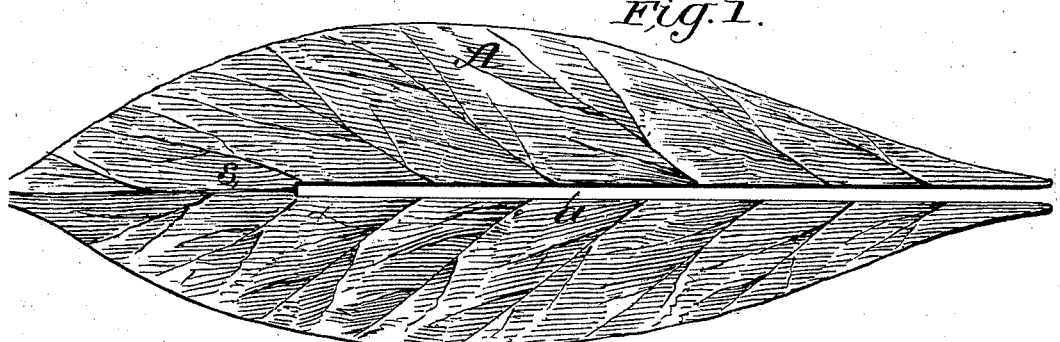
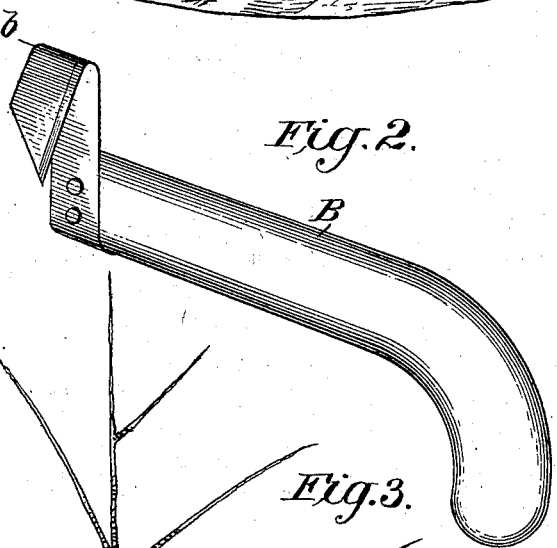
WITNESSES:
Jos. A. Ryan
Edw. W. Byrn
INVENTOR
Joseph B. Underwood.
BY Munn & Co,
ATTORNEYS.

No. 748,440. Patented December 29, 1903.

UNITED STATES PATENT OFFICE.

JOSEPH B. UNDERWOOD, OF FAYETTEVILLE, NORTH CAROLINA.

PROCESS OF HARVESTING AND CURING TOBACCO.

SPECIFICATION forming part of Letters Patent No. 748,440, dated December 29, 1903.

Application filed May 9, 1903. Serial No. 156,497. (No specimens.)

*To all whom it may concern:*

Be it known that I, JOSEPH B. UNDERWOOD, of Fayetteville, in the county of Cumberland and State of North Carolina, have invented a new and useful Improvement in Processes of Harvesting and Curing Tobacco, of which the following is a specification.

In the harvesting and curing of tobacco as practiced heretofore the long central stem which runs from one end of the leaf to the other has been allowed to remain in the leaf while it is being cured and while it is being handled and sold up to the time that it reaches the hands of the manufacturer. It is then removed at considerable expense either by hand-stemming or by expensive tobacco-stemming machines. The presence of this stem in the leaf is highly objectionable from many standpoints. In the first place, in the curing of the tobacco the stem contains so much of the juices that it takes a long time and a high heat to dry it out, the temperature sometimes reaching as high as 180° to 200° Fahrenheit, which is not only liable to produce a bitter taste and dark color in the leaf, but also involves a considerable fire risk. Furthermore, while being cured even if a satisfactory yellow color is first obtained in the leaf it is liable if a damp day comes or the temperature changes to turn dark afterward in streaks extending from the stem. This I find is due to the fact that the relatively large quantity of sap in the stem will when softened up strike back into the leaf again and produce the objectionable discoloration described. The presence of the stem in the leaf is also undesirable for many other reasons in that it adds to the freight and takes away from the soil much valuable fertilizer.

My invention is in the nature of a process by which the stem is taken out of the leaf while it is green and before being cured and by which the stem-juices are eliminated by emasculation, and preferably my process economically harvests the crop and removes the stem in one and the same operation in the field.

I have discovered that while the leaf is green, tough, and full of lubricating-juices a knife with two cutting edges formed by a bent blade, such as is used by farriers for trimming the hoofs of horses, can be made to cut the leaf from the central stalk of the plant and at the same time cleanly cut out any portion of the stem of the leaf with a clean and economical cut, leaving the central stalk with the leaf-stems attached to it all standing in the field to be returned to the soil for fertilizer, saving freights on the same, greatly improving the quality and juice of the leaf, and entirely avoiding all the incidental objections due to the presence of the stem (and its objectionable juices) in the leaf in curing, saving the ordinary expense of stemming, and greatly improving the color, taste, and commercial value of the product.

Figure 1 is a view of a leaf of tobacco having the principal portion of the stem removed in accordance with my invention. Fig. 2 is a perspective view of one of many forms of knife for harvesting the leaf and cutting out the stem, this knife being substantially what is known as a "farrier's" knife for trimming the hoofs of horses. Fig. 3 is a view showing the application of the knife to harvesting and stemming the leaf in the field, all the leaves except one having been stripped and stemmed and that one being in process of stripping and stemming.

In the drawings, A, Fig. 1, represents a tobacco-leaf which has been stemmed in accordance with my invention in a green state, the slit $a$ in the leaf representing the place from which the stem has been removed.

The knife (shown at B) preferably has a pistol-grip handle and a recurved blade $b$ sharp along the edge next to the handle, so as to cut with a pull cut. The end of the blade is bent over, so as to make something of a V-shaped loop in the turn, so that it will fit different sizes of stems and will receive the big end of the stem and as drawn toward the tip of the leaf, where the stem gets smaller, will follow closely to the stem, so as to cut cleanly without tearing, and by removing only the stem saves all loss of leaf which might otherwise adhere to the stem.

When harvesting the crop in the field, the leaf is seized in the left hand, as in Fig. 3, and the knife in the right hand is applied from the under side of the leaf near the stalk, so as to embrace the stem. The knife is then drawn toward the operator until it reaches a point where the stem becomes so small as to require no further removal, which is about two-thirds the length of the leaf, and then the left hand is slightly raised and the right hand carrying the knife is swung downwardly and backwardly, and this cuts transversely the stem at its small end and severs the leaf in the form shown in Fig. 1 and leaves the stems adhering to the central stalk, as seen in the stripped stems of Fig. 3. In this operation it will be seen that the wider opening of the V-shaped blade first receives the thick end of the stem, and as the knife is drawn to the tip as the stem gets smaller it sinks deeper in the V-shaped space in the knife, thus leaving no adhering particles of leaf on the stem, as always occurs to a certain extent in hand-stemming. I prefer to harvest the crop in this way in the field, as the harvesting and stemming is done in one operation economically; but I would have it understood that my process includes the stripping of the green leaves of their stems, whether done in the way described or whether the leaves are stripped in the usual way from the stalk with the stems in them or whether the stalk and leaves are all cut off together.

When the green leaves of tobacco have been stemmed in accordance with my invention, they are strung on wires or tied with cord or otherwise supported so as to permit a free circulation of air between them while being cured, which curing is effected by a minimum amount of heat, a shorter period of time, and with absolute certainty as to the result.

I do not claim the knife shown, nor do I confine my process to the use of such a knife, as various forms of knife might be devised, such as a double-bladed knife, or even a fine steel wire properly folded might sufficiently stem and strip the green leaf.

In describing more fully the important advantage of stemming before curing I would state that bright-yellow tobacco is worth from forty to forty-five cents a pound, whereas dark and discolored leaves will bring only ten cents a pound, and my process insures always a bright-yellow leaf, because it is done at the comparatively low temperature of 110° Fahrenheit, or a sun curing temperature, since the leaf does not have to be overcured or subjected to the high temperature required to dry and fix the sap in the large reservoir-space furnished by the stems. This also saves fuel, shortens the process of curing, and avoids largely the fire risk incident to a high temperature. It also avoids the developing of a bitter property in the leaf from high temperature, which spoils the flavor.

In my process the stem, which constitutes from twenty-five to thirty per cent. of the weight of the leaf, is left on the stalk in the field, where without other treating or handling it is returned to the soil as a fertilizer at no additional expense. With the exception of a small proportion of stems used for snuff they are usually treated as a waste product and have no value except for fertilizer, and when used as fertilizer as heretofore freight has to be paid on them both ways—first, when in the leaf they go to the barn and then to the manufacturer, and, secondly, when after being stripped from the cured leaf they are returned to the fields. My process of harvesting and curing saves the fertilizing value of the stems to the soil without any expense whatever, as well as twenty-five per cent. of the cost of freights to the manufacturer.

Having thus described my invention, what I claim as new, and desire to secure by Letters Patent, is—

1. The process of curing tobacco, which consists in first removing the central stem from the leaves while in a green state, then subjecting the stemmed leaves to a relatively low curing temperature to develop the color and flavor of the leaf portion, substantially as described.

2. The process of curing tobacco, which consists in first eliminating the stem-juices while the leaf is green, and then curing the leaf substantially as described.

3. The process of curing tobacco which consists in first eliminating the stem-juices by removal of the stem while the leaf is green and then curing the leaf.

4. The process of harvesting and curing tobacco which consists in simultaneously severing the leaf from the stalk and the stem from the leaf, leaving the stem adhering to the stalk in the field, and then curing the leaf by means of heat substantially as described.

JOSEPH B. UNDERWOOD.

Witnesses:
JOHN C. HAIGH,
E. T. LILLY.